(12) United States Patent
Tapson

(10) Patent No.: US 7,792,322 B2
(45) Date of Patent: Sep. 7, 2010

(54) ENCODING APPARATUS AND METHOD

(75) Inventor: Daniel Warren Tapson, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 988 days.

(21) Appl. No.: 11/261,555

(22) Filed: Oct. 28, 2005

(65) Prior Publication Data

US 2006/0110005 A1    May 25, 2006

(30) Foreign Application Priority Data

Nov. 1, 2004    (GB)  ................... 0424224.4

(51) Int. Cl.
G06K 9/00    (2006.01)
G06K 9/36    (2006.01)
G06K 9/46    (2006.01)
G06K 15/00    (2006.01)
H04N 1/40    (2006.01)

(52) U.S. Cl. .................. 382/100; 382/232; 358/3.28
(58) Field of Classification Search ........... 382/100, 382/232; 358/3.28; 348/461
See application file for complete search history.

(56) References Cited

U.S. PATENT DOCUMENTS

2001/0016058 A1* 8/2001 Zeng ................. 382/135
2002/0087864 A1 7/2002 Depovere et al.
2003/0188166 A1 10/2003 Pelly et al.
2004/0136565 A1 7/2004 Hannigan et al.
2007/0257988 A1* 11/2007 Ong et al. .............. 348/182

OTHER PUBLICATIONS

Andrew B. Watson et al., "DVQ: A Digital Video Quality Metric Based on Human Vision", Journal of Electronic Imaging 10(1), pp. 20-29.*
Haitsma et al. "A Watermarking Scheme for Digital Cinema," Proceedings of the International Conference on Image Processing, KIP 2001, Oct. 2001.*

* cited by examiner

Primary Examiner—Samir A. Ahmed
Assistant Examiner—Li Liu
(74) Attorney, Agent, or Firm—Oblon, Spivak, McClelland, Maier & Neustadt, L.L.P.

(57) ABSTRACT

An encoding data processing apparatus is arranged to generate a marked copy of an image by introducing a code word into a copy of the image. The apparatus comprises a code word generator operable to generate the code word. The encoding apparatus includes an image perception analyser and a strength adapter. The image perception analyser is operable to receive the image and to generate weighting factors. A combiner is operable to combine the weighted code word with the image. The image perception analyser includes a contrast masking engine, a smoothness compensation engine and a compensation combiner. The weighting factor has an effect of reducing the code word coefficients for image parts having lower relative contrast measures. A compensation combiner is operable to combine the compensation factors with the weighting factor. The likelihood of a code word being perceivable when the code word is combined with an image is reduced.

12 Claims, 9 Drawing Sheets

Target contrast detection threshold vs. marker contrast

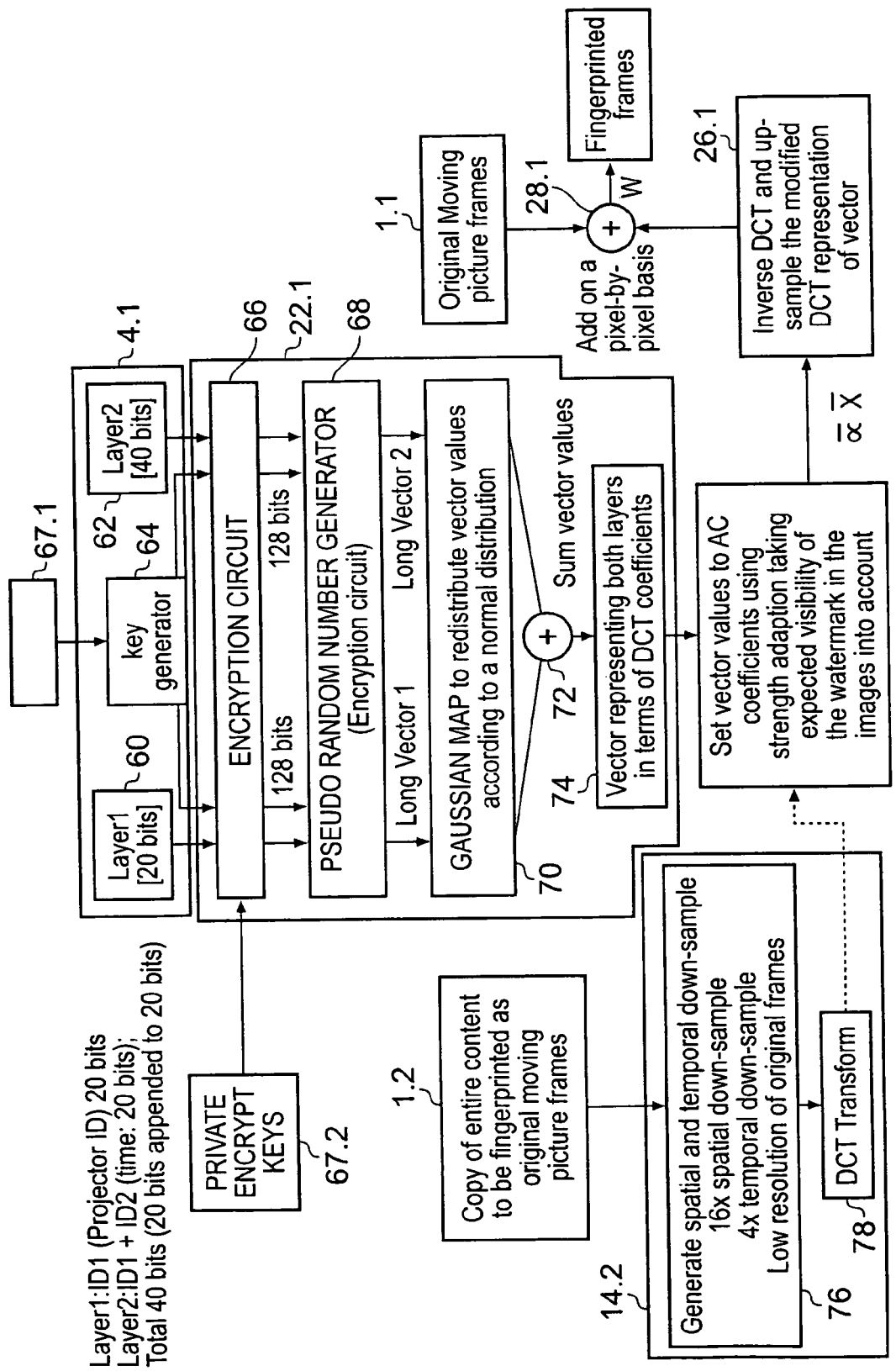

_US 7,792,322 B2_

ENCODING APPARATUS AND METHOD

FIELD OF INVENTION

The present invention relates to encoding data processing apparatus and methods for generating marked copies of images by introducing code words into copies of the images.

The present invention also relates to media terminals for generating marked copies of images for reproduction. In some applications the media terminal may form part of a digital cinema projector.

BACKGROUND OF THE INVENTION

Generally, a technique for embedding data in material to the effect that the embedded data is perceptible or imperceptible in the material is referred to as watermarking. Code words are applied to copies of material items for the purpose of identifying the copy of the material item or for conveying data represented by the code words. In some applications, watermarking can provide, therefore, a facility for identifying a particular copy of the material.

A process in which information is embedded in material for the purpose of identifying a specific copy of the material is referred to as finger printing. A code word, which identifies the material, is combined with the material in such a way that, as far as possible, the code word is imperceptible in the material As such, if the material is copied or used in a way, which is inconsistent with the wishes of the owner, distributor or other rights holder of the material, the material copy can be identified from the code word and take appropriate action.

In co-pending UK patent application number 0327854.6 an encoding data processor is disclosed for application to for example digital cinema in which payload data having two or more fields is represented by watermarking an image with one or more code words. Each value of a first field of a payload data word is associated with a first code word, and each value of a second or subsequent data field is represented by a second code word, which is selected in dependence upon the value of the first data field. As such a detected code word can be used to identify one of a plurality of sub-sets into which the data words are divided, each data word in the sub-set having the same value in the first field. A second or subsequent field of the data word from the sub-set can be then identified by detecting a second code word from the material item. The second code word identifies a value in the second data field as well as the value of the first data field.

The first and second fields can be assigned to different associated parameters such as for example address parameters. The first field could therefore identify the country of distribution of the material, whereas the second field could identify a particular distribution outlet within the country. The second field may additionally identify information in the first or indeed any other field or fields. A watermarking system can be formed for identifying a point of distribution of copies of video material. However, for applications such as digital cinema it is desirable to reduce a likelihood of an embedded code word causing any perceivable degradation of the image. An example of a technique for reducing the likelihood of any perceivable degradation of a marked image is disclosed in an article entitled "A Watermarking Scheme for Digital Cinema," by Jaap Haitsma and Ton Kalker, published in Proceedings of the International Conference on Image Processing," KIP 2001, Thessaloniki, Greece, Oct. 7 to 10, 2001. In this published article there is disclosed a technique for watermarking an image for digital cinema, in which the mean luminance of every frame is modified in the temporal axis only. Furthermore, an amount by which the luminance of a pixel is change to embed a watermark code word is adapted in dependence upon a local scaling factor. The local scaling factor is determined for every pixel in accordance with whether an area surrounding the pixel is a moving texture area or a non-moving flat area.

SUMMARY OF INVENTION

An object of the present invention is to reduce a likelihood of code word, which is introduced into an image having a perceivable effect on the image.

According to the present invention there is provided an encoding data processing apparatus for generating a marked copy of an image by introducing a code word into a copy of the image. The apparatus comprises a code word generator operable to generate the code word having a plurality of code word coefficients. The encoding apparatus includes an image perception analyser and a strength adapter. The image perception analyser is operable to receive the image and to generate weighting factors for scaling the code word coefficients with respect to parts of the image with which the code word coefficients are to be combined. The strength adapter is operable to combine the weighting factors with the code word coefficients, and a combiner is operable to combine the weighted code word coefficients with the image. The image perception analyser includes a contrast masking engine, a smoothness compensation engine and a compensation combiner. The contrast masking engine is operable to determine for each of a plurality of parts of the image a relative measure of contrast and to calculate for each part at least one weighting factor in accordance with the relative contrast measure. The weighting factors have an effect of reducing the code word coefficients for image parts having relatively low contrast. The smoothness compensation engine is operable to determine for each image part a smoothness factor, and to generate compensation factors in accordance with the smoothness factors. The compensation factors are determined so that when the compensation factors are combined with the corresponding weighting factors the strength of the code word coefficients are reduced for higher smoothness factors. The compensation combiner is operable to combine the compensation factors with the weighting factors to provide compensated weighting factors for adapting the strength of the code word coefficients.

Encoding data processing apparatus according to embodiments of the present invention can provide an advantage in that a likelihood of an effect of a code word being perceivable when the code word is combined with an image is substantially reduced. This is because an image perception analyser is provided which includes a contrast masking engine. In some embodiments, for each part of the image, the contrast masking engine determines for each image part a relative contrast measure and generates a weighting factor value in proportion to the contrast measure. However, it has been discovered that generating weighting factor values based on the contrast alone can cause an over estimation of a strength of a code word coefficient which can be allowed. This is due to an overall contrast being determined to be high for an image part which includes edges and other relative image changes, but which is otherwise smooth. Therefore, by calculating a smoothness factor for an image part, a compensation factor can be generated which can be used to compensate for such an over estimation.

In some embodiments the relative contrast measure is determined by performing a Discrete Cosine Transform (DCT) on the image and comparing each Alternating Current (AC) coefficient with a Direct Current (DC) coefficient of each of a plurality of DCT coefficients of the image provided by the Discrete Cosine Transform. A masking function is operable to determine a maximum allowable contrast of a code word coefficient, which would be produced for the code word in the spatial domain. The weighting factor value is then determined by the contrast masking function by scaling the maximum allowable contrast of the code word with a DC coefficient value of the code word in the DCT domain.

As indicated above, calculating weighting factor values in accordance with a relative contrast measure based on the comparison of the AC to DC DCT coefficients can perform well for smoothly varying images. However edges in an image part can place energy in many AC coefficients of the DCT transform, which can lead to an over-estimation of a code word coefficient strength, which can be allowed. This is because, edges can indicate an image part of high contrast, which is otherwise smooth. A smoothness compensating function is therefore provided which determines a smoothness factor for an image part. The smoothness factor for each image part is determined from a number of pixels in the image part, which are considered to be smooth. A pixel may be considered to be smooth from a number of its neighbouring pixels, which have a value, which is within a predetermined threshold of the pixel's value. If the number of neighbouring pixels having a difference with respect to the pixel's value exceeds a predetermined number, then the pixel is determined to be smooth. If the number of smooth pixels in an image part exceeds a predetermined number then the image part is determined to be smooth. A compensation factor value can be calculated using the smoothness factor from a predetermined relationship established with respect to the human eye's sensitivity to visual changes within the image part having a particular smoothness factor.

Various further aspects and features of the present invention are defined in the appended claims. These aspects include a media terminal, a cinema projector and a method of generating a marked copy of an image.

BRIEF DESCRIPTION OF THE DRAWINGS

Embodiments of the present invention will now be described by way of example only with reference to the accompanying drawings, where like parts are provided with corresponding reference numerals, and in which:

FIG. 6 is a schematic block diagram of a second example encoding apparatus for combining an image with a code word according to the present technique;

DESCRIPTION OF EXAMPLE EMBODIMENTS

General Watermarking Encoder

Figure 1:
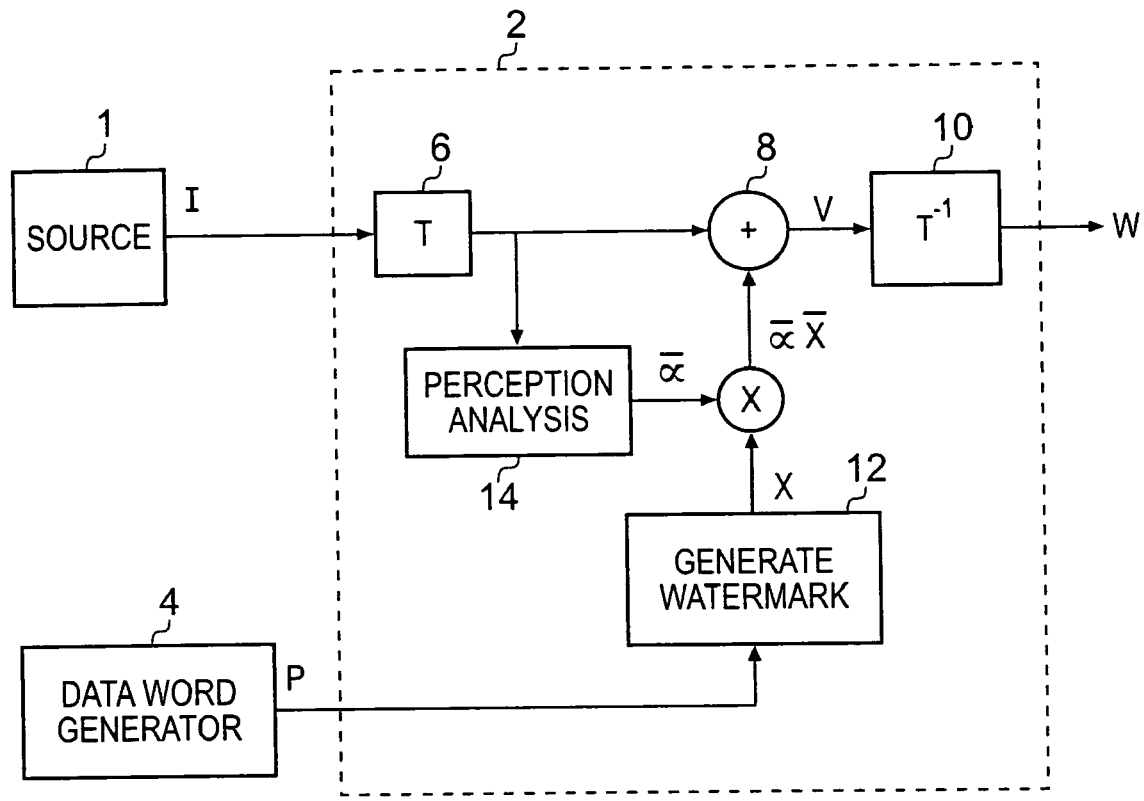
FIG. 1 is a schematic block diagram of a known encoding apparatus for combining an image with a code word to form a marked version of the image.

An example of a known encoding data processing apparatus, which is operable to generate watermarked images by combining or embedding a code word with the images, is shown in FIG. 1. The known encoding data processing apparatus shown in FIG. 1 is disclosed in European patent application EP 1324263 A. In FIG. 1 images I are generated by a source 1 and fed to an encoder 2 which is arranged to combine payload data words P generated by a data word generator 4 so that at the output of the encoder 2 a marked copy W of the images I is formed. As shown in FIG. 1, the encoder 2 includes a transform processor 6, a combiner 8 and an inverse transform processor 10. The encoder also includes a watermark code word generator 12 generates a code word or code words X having a plurality of code word coefficients. Each code word represents a payload data word P or a part of the data word P generated by the data word generator 4. The transform processor 6 receives the source image I and performs a transform such as a Discrete Wavelet Transform (DWT) or a Discrete Cosine Transform (DCT) to convert the image into the transform domain. A perceptual image analyser 14 is arranged to receive a copy of the transform domain image I which is to be marked with the code word X and generates a weighting factor α for each part of the image with which the code word coefficients are to be combined. For example, each luminance component of the image pixels may be arranged to carry one or more of the code word coefficients. The weighting factors α are therefore adapted to the effect that the weight of the code word coefficients is made as high as possible, to increase a likelihood of detection of the code word whilst as far as possible reducing a likelihood of the effect of the code word being perceived by the human eye when the code word is combined with the image I. A strength adaptor 14 is therefore arranged to combine the weighting factors α with the code word coefficients. The weighted code word coefficients are then combined with the image in the transform domain by the combiner 8 and the marked copy of the image W is then formed by the inverse transform processor 10 by forming an inverse transform on the marked transform domain image V.

In the following description the term "samples" will be used to refer to discrete samples from which an image is comprised. The samples may be luminance samples of the image, which is otherwise, produce from the image pixels. Therefore, where appropriate the term samples and pixels are inter-changeable.

Video images are one example of material, which can be protected by embedding a digital code word. Other examples of material, which can be protected by embedding a code word, include software programs, digital documents (optionally reproduced on paper or other media), music, audio signals and any other information-bearing signal.

Watermark Encoder

Figure 2:
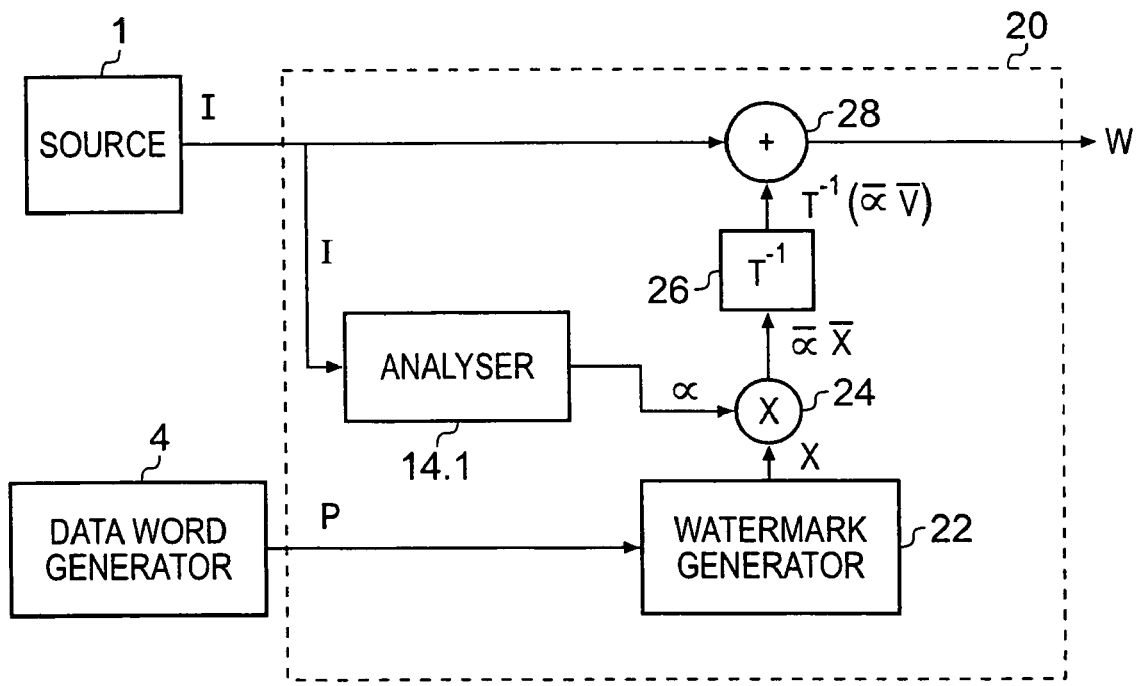
FIG. 2 is a schematic block diagram of an encoding apparatus for combining an image with a code word according to the present technique.

An encoding data processing apparatus, which operates in accordance with the present technique, is shown in FIG. 2. Unlike the conventional arrangement shown in FIG. 1, the encoding data processing apparatus shown in FIG. 2 is arranged to combine the code word with the image to form the marked copy in the base band domain. The encoder 20 shown in FIG. 2 includes a code word generator 22 which arranges the code word coefficients into a form corresponding to a transform domain representation of the image. Weighting factors are then generated by a perceptual analyser 14.1 in accordance with a relative ability of the image to carry the code word coefficients with a maximum strength whilst minimising a risk of the code word being perceivable when added to the image I. The weighting factors are received by a strength adaptor 24 and combined with the code word coefficients to form weighted code word coefficients. The weighted code word coefficients are then transformed into the base band domain by an inverse transform processor 26, which performs an inverse transform on the code word. The base-band domain code word is then combined with the base band domain image by a combiner 28 to form the marked copy of the image W.

According to one example of the present technique, the transform domain representation includes either a temporal and/or spatial down-sampled representation with respect to a sampling rate of the base band domain image. The code word is therefore arranged in a form or treated as if the code word were in a form in which it had been spatially and/or temporally down-sampled with respect to the base band version. As such the inverse transform processor is arranged to temporally and/or spatially up-sample the code word coefficients to form a base band version of the code word, in which form the code word is combined with the base band image I to form the marked copy of the image W.

In some embodiments utilising the present technique, the transform domain representation of the code word may include a Discrete Cosine Transform (DCT), a Fourier Transform or a Discrete Wavelet Transform. For example, the code word could be formed as if in a DCT domain, so that the inverse transform processor 26 may be arranged to perform an inverse DCT on the code word coefficients before being spatially and/or temporally up-sampled. Accordingly, contributions from the codeword coefficients may be localised within certain preferred frequency bands of the image.

Figure 3:
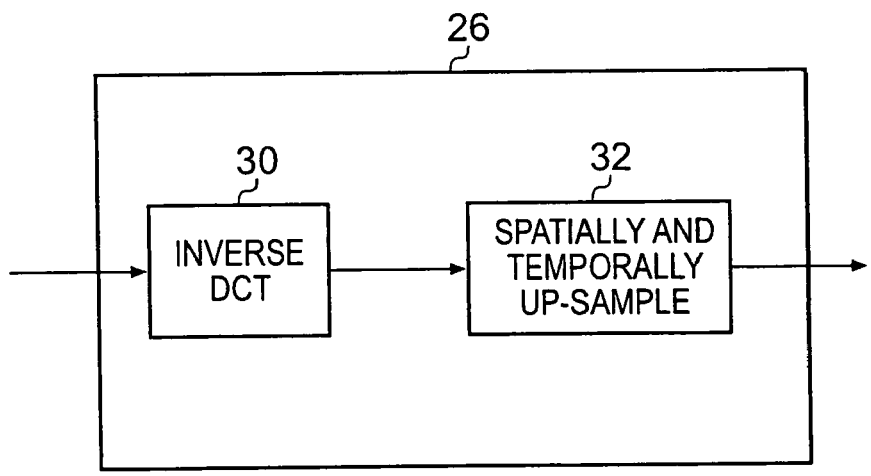
FIG. 3 is a schematic block diagram of an inverse transform processor forming part of the apparatus shown in FIG. 2.

An example of an inverse transform processor 26 is shown in FIG. 3 in more detail. As shown in FIG. 3, the inverse transform processor 26 includes an inverse DCT transformer 30 which performs an inverse DCT on the down-sampled code word as formed into a DCT domain image. An up-sampling processor 32 is then operable to spatially and/or temporally up-sample the code word to provide a sampling rate which corresponds to that of the base band domain image into which the code word is to be introduced.

Embodiments which utilise the present technique provide an advantage with respect to conventional arrangements in that generation and strength adaptation of the code word coefficients is performed at a lower rate and lower bandwidth with respect to the base band image. For an example where the image represents frames of high definition television pictures or digital cinema images in which the number of pixels in an image frames comprises 4096×2048 pixels ($8 \times 10^6$ pixels), the code words for combining with the base band image can be formed in the transform domain as 256×128 pixel frames. Correspondingly, the weighting factors generated by the perceptual analyser 14.1 can be 256×128 factors per frame. The strength adapter 24 therefore can perform the combination of the code word coefficients and the weighting factors at a relatively low rate requiring, for example, only 256×128 multiplications as opposed to 4096×2048 multiplications which would be required if the code word coefficients were combined with the image in the base band domain. As explained above, conventional arrangements such as that shown in FIG. 1, combine the code word with the image in the transform domain. As such, the transform processor 6 would be required to perform a transform, such as a DCT on an image frame comprising 4096×2048 pixels, and then a corresponding inverse transform. As can be appreciated, this would represent a significant amount of processing power in terms of a number of calculations per second. Embodiments utilising the present technique therefore reduce an amount of processing required and can therefore be implemented using a substantially reduced number of computations per second, because the transform domain includes a down-sampled representation thereby allowing a less expensive implementation.

Image Perception Analyser

Figure 4:
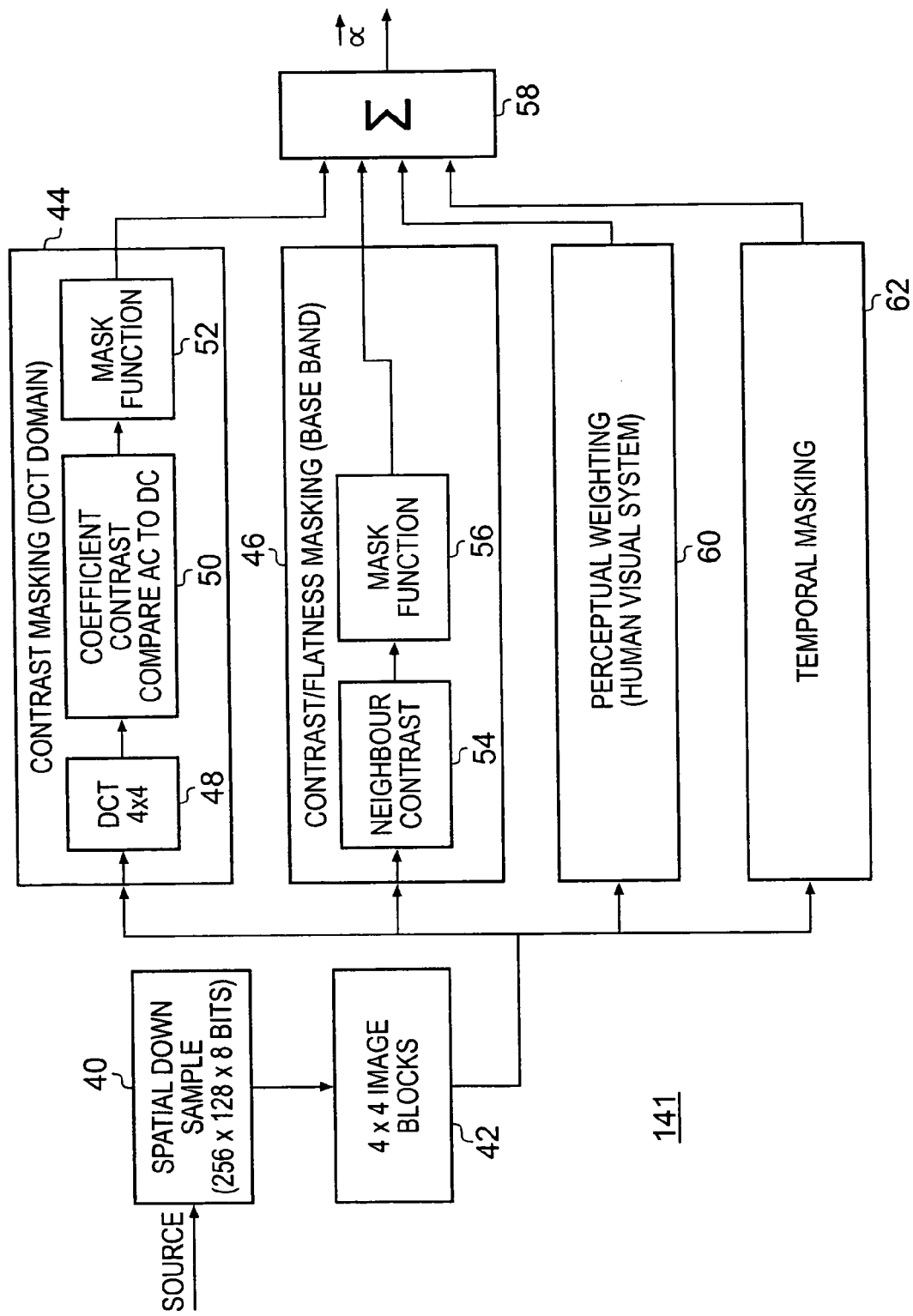
FIG. 4 is a schematic block diagram of a perceptual image analyser which forms part of the encoding apparatus of FIG. 2.

As explained above, an image perception analyser 14 is arranged to calculate the weighting factors for adapting the code word coefficients in accordance with an ability of the image, or parts thereof to mask the visual presence of contributions from the code word coefficients. The effect of the code word should be therefore, as far as possible be substantially imperceptible in the image. An example of an image perception analyser utilising the present technique is shown in FIG. 4. In FIG. 4 the signal representation of the image is received from the source by a spatial domain down sampler 40, which spatially down-samples the received images. According to one example in which the images are formed from images generated according to the digital cinema standard, the source images comprise 4096×2048 pixels each pixel having 12 bit samples. For this example the spatial down sampler may down-sample the images to 256×128 pixels each having 8 bit samples. The down-sampling may be different to the down-sampled representation in which the code word is formed for combining with the image. The spatially down sampled images are then received by an image divider, which is arranged to divide the down-sampled image into 4×4 image blocks. The down sampled image is then received from the image divider 42 by at least a contrast masking engine 44 and a smoothness making engine 46.

Figure 5:
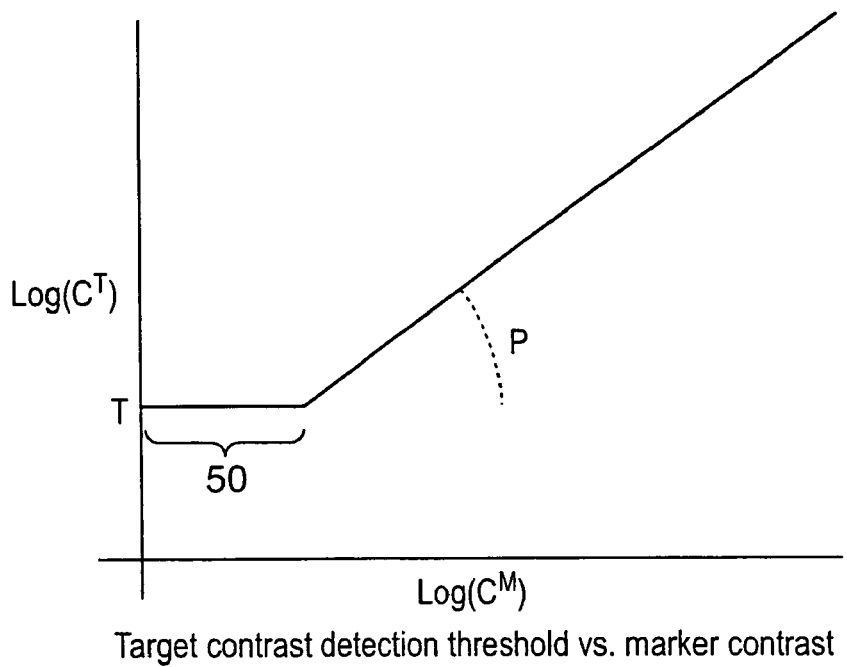
FIG. 5 is a graphical representation of a relative contrast measure of a code word coefficient with respect to a relative contrast measure of an image block to which the code word coefficient is to be added.

The contrast-masking engine 44 includes a DCT transformer 48, which is arranged to transform 4×4 blocks of pixels into the DCT transform domain. A coefficient contrast comparator 50 then receives the transform domain image. The contrast comparator compares the DC value of the DCT coefficients with the AC value of the DCT coefficients within each 4×4 pixel block to form a relative contrast measure for the DCT coefficient concerned. From a predetermined relationship between a relative contrast measure which would be produced by the code word coefficient with respect to a relative contrast measure of the image block which would mask this code word coefficient, a maximum allowable contrast is determined for the relative contrast measure of the DCT coefficient concerned. A weighting factor is then calculated by scaling the maximum allowable contrast measure with the value of the DCT coefficient concerned. This process is explained in more detail in the following paragraphs:

The contrast-masking engine 44 applies a technique referred to as contrast masking in which a target signal T, which in this case is the watermark code word is hidden by another signal M, which is referred to as the masker, which in this case is the image. According to the present technique, the image signal is tested to determine a relative ability of the image to mask the watermark code word coefficient or coefficients. The masking ability is assessed in accordance with frequency sensitivity in that the human visual sensitivity differs for different spatial frequency and orientation. The contrast masking ability is greatest when the masking signal and the target signal are spatially coincident and are of similar frequencies. For this reason, the masking of each watermark code word coefficient is considered with respect to corresponding DCT coefficients of the source image. The contrast of the source AC coefficient u, v in an image block b of the source S to the ratio of the DC value is defined as follows:

$$C_{b,u,v}^S = D_{b,u,v}^S / D_{b,0,0}^S$$

Where $D_{b,u,v}$ are the u, v coefficients of the block b of the DCT transform of the source image. The human visual sensitivity threshold of a target of contrast $C_T$ in the presence of a masking image of contrast $C_M$ is modelled using a predetermined perception function. An example of such a perception function is as illustrated in FIG. 5. As can be seen for the example of FIG. 5 in a flat region of the function 50, for small values of contrast of the masking image $C_M$ the maximum value of the target contrast $C_T$ below which the watermark code word coefficients can be added is constant. According to the function illustrated in FIG. 5, at a threshold $T_{u,v}$ the log contrast of the target rises linearly with respect to the log of the value of the masking contrast $C_M$. The value of the threshold is different for each of fifteen AC coefficients, higher spatial frequencies having higher threshold values. The values of the threshold $T_{u,v}$ and an exponent value $P_{u,v}$ illustrated in FIG. 5 are determined empirically. Applying the function illustrated in FIG. 5, a maximum allowable watermark coefficient value, which can be applied for a given data block $D_{b,u,v}$ is defined by the equation below:

$$\alpha_{u,v} = D_{b,u,v}^W = T_{u,v} D_{b,0,0}^S \max(1, [D_{b,u,v}^S / T_{u,v} D_{b,0,0}^S]^{P_{u,v}})$$

Accordingly, the weighting value $\alpha_{u,v}$ is calculated for each image data block $D_{b,u,v}$ to ensure that the coefficient value does not exceed the maximum allowable value calculated above. Effectively, therefore the weighting factor is calculated by determining the maximum allowable contrast caused by the code word coefficient determined from a ratio of the AC coefficient to the DC coefficient of the coefficient in the DCT domain. The weighting factor is calculated by scaling the maximum allowable contrast with the DC value of the DCT domain coefficient of the code word.

As mentioned above, the spatially down sampled image is also received from the image divider 42 by the smoothness compensation engine 46. The smoothness compensation engine 46 is provided to compensate for some limitations of the contrast masking engine 44. The contrast-masking engine 44 can operate well for smoothly varying signals. However edges in images can place energy in many of the coefficients of a DCT block and can lead to an overestimate of the maximum allowable watermark code word coefficient. For this reason the smoothness compensation engine 46 calculates a correction factor for each DCT block which varies between zero and one [0, 1] to an effect of reducing the weighting value $\alpha_{u,v}$ in the presence of smooth areas and edges. The smoothness engine 46 includes a neighbour contrast calculator, which is arranged to determine a smoothness factor of a block by counting the number of smooth pixels in the block $D_{b,u,v}$. A pixel is determined to be smooth if a sufficient number of its nearest neighbours are within a neighbourhood threshold of its own value. The smoothness factor of a block is then calculated as a function of the proportion of smooth pixels in the block. The neighbourhood threshold of pixel values, which is used to define whether a pixel is determined as being smooth, and the relationship between the smoothness factor and the compensation factor is determined empirically from an effect of combining code word coefficients with the image blocks with certain smoothness factors, as judged by the human eye.

Once the compensation factor has been calculated by the smoothness engine 46, these are received by a weighting factor combiner 58 and combined with the weighting factors generated by the contrast masking engine 44. The weighting factors are then fed to the strength adapter 24 as shown in FIG. 2.

As shown in FIG. 4, in some embodiments the perceptual analyser 14.1 may also include a perceptual weighting engine 60 and a temporal masking engine 62. The perceptual weighting engine 60 is arranged to generate an adjustment to the weighting factors generated by the contrast masking engine 44 and the smoothness masking engine 46 in accordance with a function based on the human visual system. Thus according to an empirically determined function derived from human perception adjustment factors are generated based on the source image in the spatial domain and combined with the weighting values generated by the contrast masking engine 44 and the smoothness compensation engine 46 by the combiner 58. Similarly the temporal masking engine 62 is arranged to generate an adjustment to the weighting factors generated by the contrast masking engine 44 and the smoothness masking engine 46 in accordance with temporal changes to the video images. Thus for example, at moments of scene change in the image, humans are less sensitive to noise and/or visual imperfections in the image. Accordingly watermark code word coefficients are introduced into video images after scene changes in the video images. Scene changes are therefore detected in the video source images in the spatial domain and combined with the weighting values generated by the contrast masking engine 44 and the smoothness compensation engine 46 by the combiner 58.

More Detailed Encoder Example

FIG. 6 provides a more detailed example of an encoding data processing apparatus which is arranged to embed a watermark code word into a copy of an information material item such as video images. The encoding data processing apparatus shown in FIG. 6 includes a payload data word generator 4.1 which is arranged to operate in accordance with co-pending UK patent application number 0327854.6 to generate a code word having at least two parts or layers to represent two fields of a payload data word. The code words are arranged to represent the two fields in a hierarchical manner with the effect that the first code word identifies the first data field, whereas the second code word identifies a value of the second data field conditioned on the first data field. As such a detected code word can be used to identify one of a plurality of sub-sets into which the data words are divided, each data word in the sub-set having the same value in the first field. A second or subsequent field of the data word from the sub-set can be then identified by detecting a second code word from the material item. The second code word identifies a value in the second data field as well as the value of the first data field. The arrangement of the data fields in association with the watermark code words uniquely identifies a layer hierarchy of data field values, which can be used to convey different types of information.

As shown in FIG. 6, the code word generator 4.1 includes a first layer data word generator 60 and a second data word generator 62. The first and second data word generators 60, 62 are arranged to generate respective data words which may in some applications be utilised to embed an identifier having a first part ID1 and a second part ID2. As explained in co-pending UK patent application number 0327854.6 two code words may be generated to represent payload data having at least two parts or layers. The code words are arranged to represent the two fields in a hierarchical manner with the effect that the first code word identifies the first data field, whereas the second code word identifies a value of the second data field conditioned on the first data field. The payload data may be an identifier, the first data field providing a first identifier ID1 which is represented by a first code word, whereas the first and second parts ID1+ID2 of the identifier may be represented by a second code word. As shown in FIG. 6, the first layer data word generator 60 generates the first layer data word ID1 of 20 bits, whereas the second layer data word generator 62 generates the second layer data word ID1+ID2 of 40 bits. The first layer data word represents the first part of the identifier ID1, whereas the second layer data word represents the first and second parts of the identifier ID1+ID2.

In a digital cinema application the first part of the identifier ID1 can represent the projector identifier whereas the second part of the identifier ID2 can represent a time, date or location at which the cinema film was displayed.

The data word generator 4.1 of the encoding data processor shown in a FIG. 6 also includes a key generator 64, which generates keys for generating the code words to represent the first and second data word layers. The key generator 64 generates two keys for the first and second layers, which are fed to an encryption circuit 66 forming part of a code word generator 22.1. The keys may be provided from an interface 67.1. The encryption circuit 66 receives first and second private encryption keys from a second interface 67.2 and encrypts the first and second data word layers in accordance with a private key encryption process to form first and second encrypted data word parts. In the example of FIG. 6, the first and second encrypted data words each comprise 128 bits. The first and second encrypted data words are received by a pseudo random number generator 68. The pseudo random number generator 68 also receives first and second keys from the key generator 64 which also comprise 128 bits. The pseudo random number generator uses the first and second encrypted data word layers as seeds to generate code word coefficients for each of two code words to represent the first and second data word layers. The first and second code words are then received by a Gaussian mapping processor 70 which is arranged to redistribute the coefficients of the first and second code words according to a normal distribution. The Gaussian distributed code words are then combined by a combiner 72 to form a composite code word 74. A vector representing both data word layers is thereby formed and passed from the code word generator 22.1 to the strength adapter 24.1.

In FIG. 6, a more simplified version of the perceptual analyser 14.2 shown in FIG. 4 is arranged to generate weighting factors for combination with the code word coefficients as explained for the perceptual analyser 14.1 of FIG. 4. However, the perceptual analyser 14.2 of FIG. 6 is shown as only including a spatial and temporal down-sampler 76, which is arranged to receive a copy of the base band source images and to form a low resolution version of the source images by spatial and temporal down-sampling. The low resolution image is then transformed into the DCT domain by a DCT transform processor 78 and fed to a strength adaptor and combiner 80.

The strength adaptor and combiner 80 adjusts the weight of the transform domain code word coefficients received from the code word generator 22.1. For the example shown in FIG. 6, the code word coefficients are adjusted with respect to an AC values of the DCT coefficients with respect to the DC value as explained with reference to the contrast masking engine 44 of the image perceptual analyser 14.1 of FIG. 4. In other embodiments the image perception anslyser 14.2 may include one or all of the smoothness compensation engine 46, the perceptual weighting engine 60 or the temporal masking engine 62.

Figure 7:
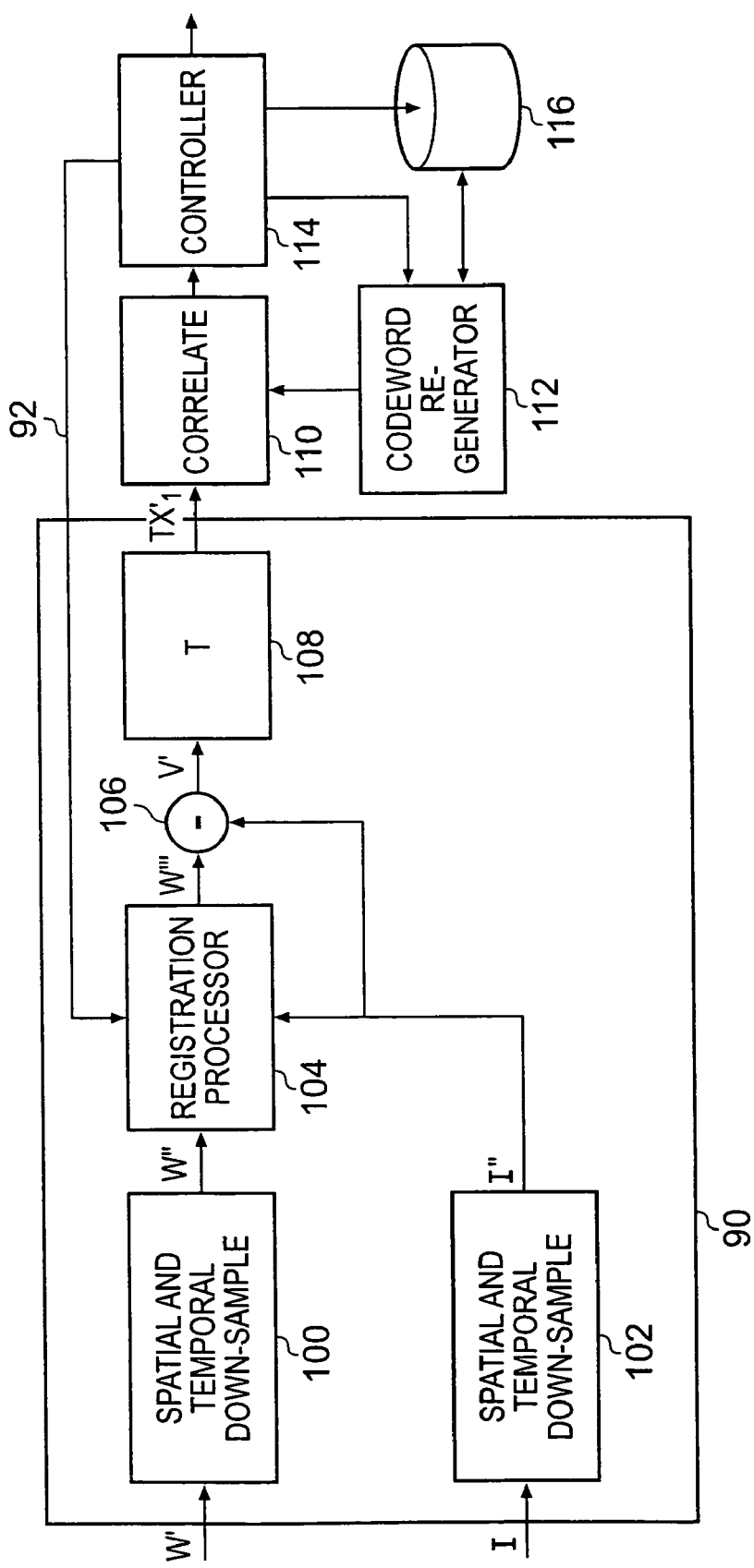
FIG. 7 is a schematic block diagram of a detecting data processing apparatus for detecting payload data represented by code words present in marked copies of images.
Figure 8:
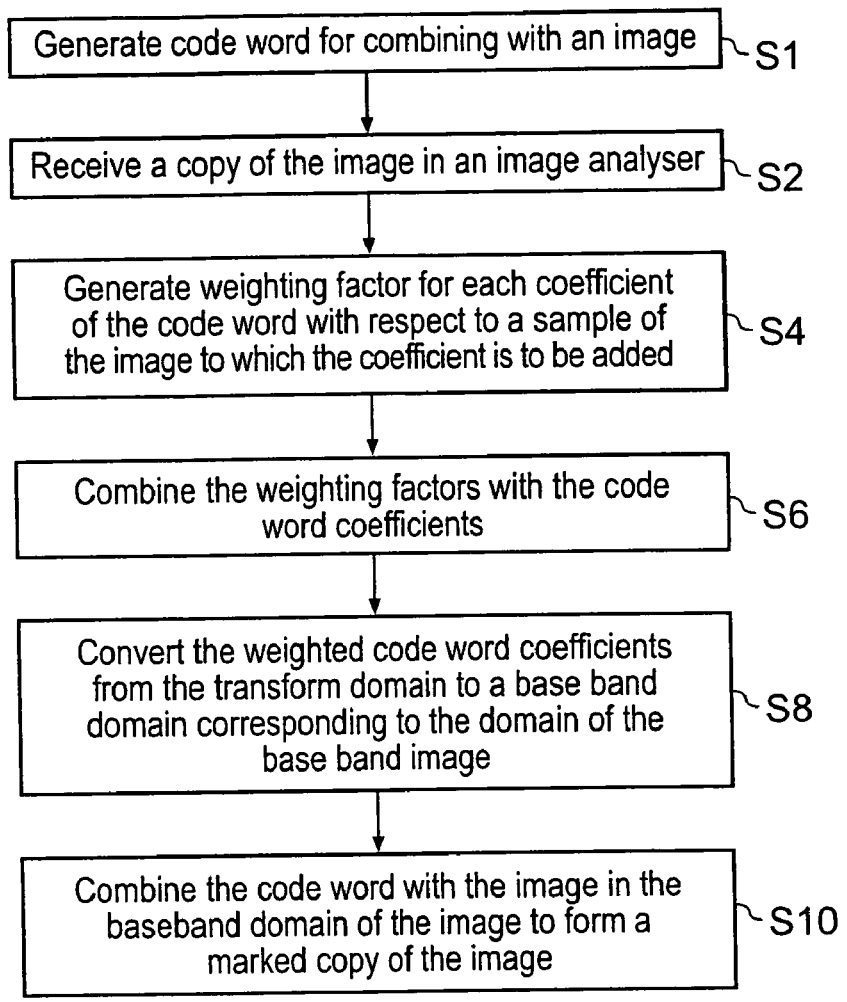
FIG. 8 is a flow diagram illustrating a process performed by an encoding data processing apparatus according to the present technique.

The perceptually weighted code word coefficients are then formed into a DCT domain representation of the source image, to which the code word is to be embedded. The code word coefficients are then received by an inverse transformer 26.1 which operates as described above to perform an inverse DCT transform on the spatially and temporally down-sampled image, to convert the image into the spatial domain. The spatial domain down-sampled image is then spatially and temporally up-sampled to the base band domain. The marked copy of the images Ware then formed by a combiner 28.2 which is arranged to add the spatial domain coefficients to the original images I, to form finger printed frames. The finger printed frames may then be for example projected such as in a digital cinema Detecting Processor A detecting apparatus, which is arranged to detect code words and to recover a payload data word if present in the material item is shown in FIG. 7. In FIG. 7 an offending version of the watermarked image W' and a copy of the original image I are received in a recovery processor 90. Within the recovery processor 90, the marked image is received at a first down-sampling processor 100. The copy of the original image I is fed to a second down-sampling processor 102. The first and second down-sampling processors 100, 102 each spatially and temporally down sample the received images W', I to form reduced resolution versions. The reduced resolution versions correspond to the down-sampled version with respect to which the code word was formed in the transform domain, when embedded in the image I in the encoding data processor.

The recovery processor 90 is arranged to process the marked image and the original image and to form an estimate of a code word which may have been embedded in the marked image. For the example shown in FIG. 7, the recovery processor 90 also includes a registration processor 104, a comparator 106 and a transform processor 108.

The offending version of the image W' may have been produced by photographing or otherwise reproducing a part of the watermarked image W'. As such, in order to improve the likelihood of detecting the identification code word, the registration processor 104 is arranged to receive the down-sampled version of the image I' and the suspected marked copy W'' and to align substantially the offending image with the original version of the image. One example of a process for registering a received image with the original version of the image is provided in European patent application number 1 324 263 A. The purpose of this alignment is to provide a correspondence between the down-sampled original image samples I' and the corresponding samples of the down-sampled watermarked image W'' to which the code word coefficients have been added, thereby increasing a likelihood of correctly detecting a code word, or reducing the false negative detection.

The registered image W''' is received by the comparator 106 also forming part of the recovery processor 90. The comparator 106 also receives a copy of the down-sampled original image I' and proceeds to subtract the samples of the original image I' from the registered watermarked image W'''. Since the watermark code word was embedded into the image I' in the spatial domain there is no requirement to transform the image into the frequency domain to recover an estimate of the watermark code word V' The estimate of the code word V' in the spatial domain is then fed to the transform processor 108 which forms an estimate of the code word by performing a DCT on the reduced resolution samples to form an estimated code word X'.

The output of the transform processor 108 therefore provides an estimate of the coefficients of the code word, which is to be identified. The recovered code word X' is then fed to a first input of a correlator 110. The correlator 110 also receives on a second input a re-generated code words $X^i$ produced by the code word generator 112. The code word generator 112 operates to reproduce code words under the control of a control processor 114. The control processor 114 therefore has access to a data store 116, which stores seeds and keys for generating the watermark code words. The control processor 114 controls the correlator 110 and the code word re-generator to correlate, with the estimated code word, each of the code words in the set of possible code words, which may have been embedded in the image. If a result of the correlation exceeds a predetermined threshold then the control processor 114 determines that the code word was present in the estimated code word and accordingly the corresponding payload data word layer or identifier ID1, ID2 is considered to have been detected.

According to the present technique the detecting data processor illustrated in FIG. 7 is arranged to identify the payload data word having first and second layer parts to recover the identification data ID1, ID2. An advantage is provided by the decoder according to the present technique in that most of calculations and processing performed by the detecting data processor are performed on a down-sampled version of samples corresponding to the original base band image from which the estimated code word is recovered. That is, the DCT transform and correlation of the re-generated code words with the estimated version of the code word are performed on a down sampled version of recovered samples of the code word. As can be appreciated, for the example application of digital cinema, the source images may comprise 4096×2048 pixels each pixel having 12 bit samples. For this example the down sampling may reduce the size of the images to be decoded to, for example 256×128 pixels each having 8 bit samples. Accordingly, a substantial reduction in the amount of processing which is required to detect and recover an estimate of the code word is provided.

Summary of Operation

Encoding Process

Figure 9:
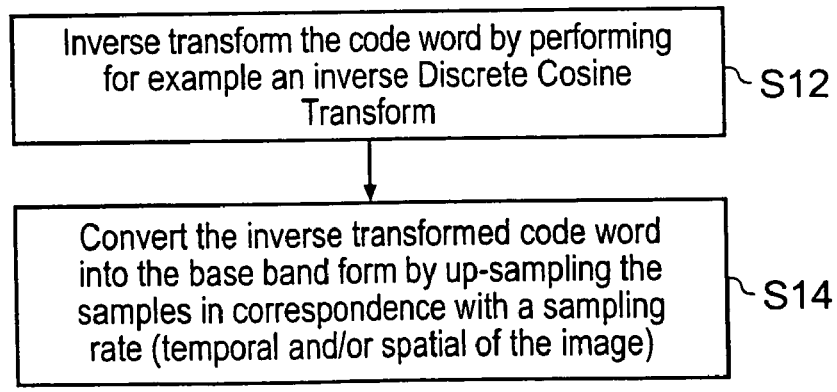
FIG. 9 is a flow diagram illustrating an example process of inverse transforming a code word, which may be performed in the process represented in FIG. 8.

A flow diagram illustrating process steps involved in encoding an image to form a marked copy of the image is provided in FIG. 9. The operations performed by the encoding process illustrated in FIG. 9 are summarised as follows:—

S1: The code word is generated for combining with the image in order to generate a marked copy of the image. As illustrated in FIG. 6 this may involve several steps of generating a key as well as generating the payload data including parts which represent different layers. The payload data may then by encrypted to form a seed which is used by a pseudo random number generator with a key to generate the code word coefficients for combining with the image. As illustrated in FIG. 6 the code word coefficients may also be processed in accordance with a Gaussian map to redistribute the vector values according to a normal distribution.

S2: A copy of the original image is also received by an image analyser.

S4: Weighting factors are then generated for each coefficient of the code word with respect to a part of the image to which the coefficient is to be added.

S6: The weighting factors are then combined with the code word coefficients to form strength adapted code word coefficients.

S8: The weighted code word coefficients are then converted from the transform domain to a base band domain corresponding to the domain of the base band image in its original form.

S10: The code word is then combined with the image in the base band domain to form a marked copy of the image.

Figure 10:
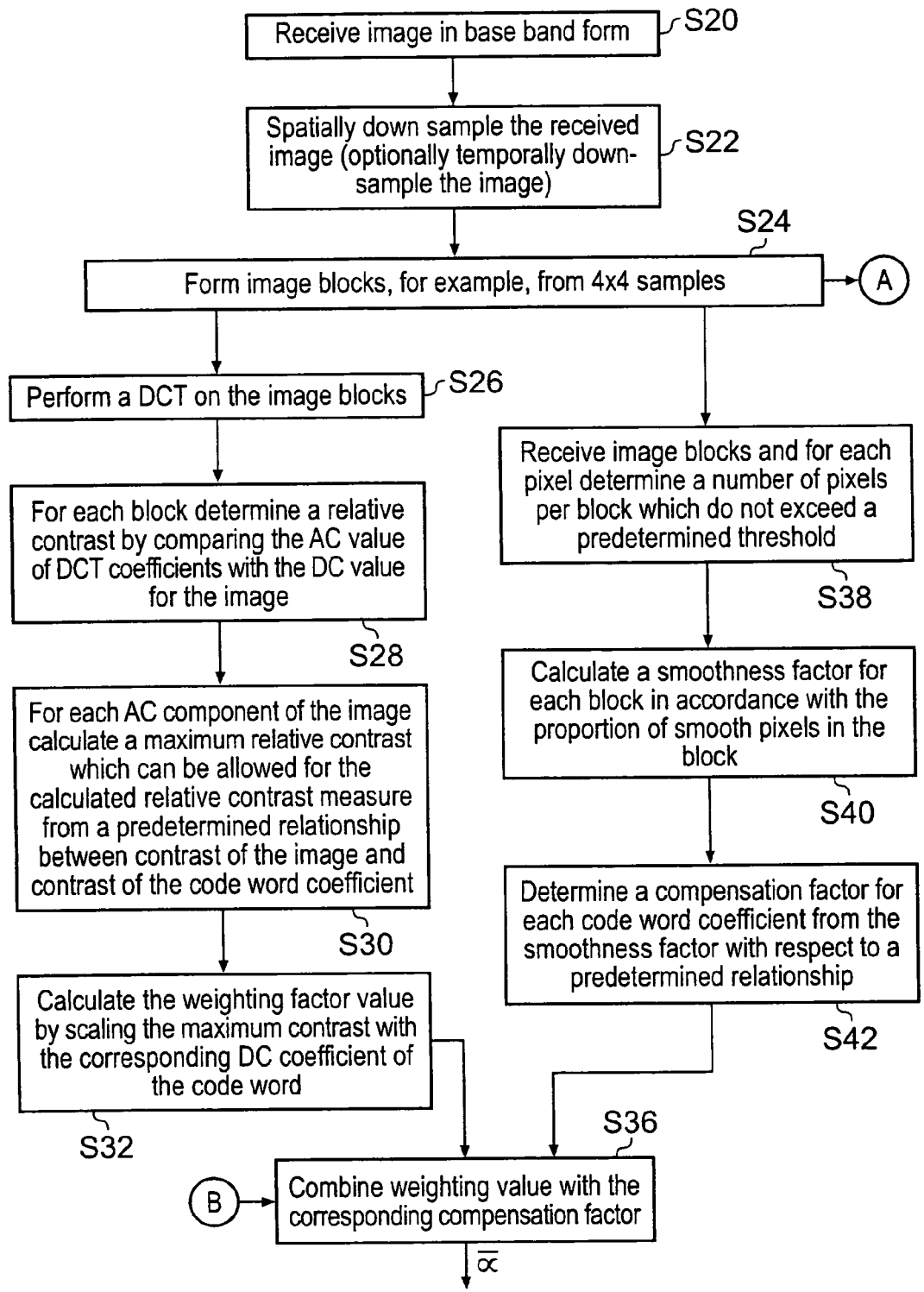
FIG. 10 is a flow diagram illustrating a process performed by a perceptual image analyser to determine weighting factors for strength adapting coefficients of the code word.

As already explained above, in one example the transform domain is the DCT domain in combination with a down-sampled representation with respect to the sampling rate of the image signal. Thus the transform domain corresponds to a temporally or spatially down sampled version of the sampling rate of the original image. As such, an example of the process step S8 for converting the transform domain code word into the base band domain is represented in FIG. 10. The steps in FIG. 10 are summarised as follows:—

S12: The code word is converted from the transform domain which may be referred to as the frequency domain into the spatial domain by performing an appropriate transform. For example, the inverse DCT may be performed to convert the code word formed in the DCT domain into the spatial domain.

S14: The inverse DCT transformed code word is then converted into a base band form by up-sampling the samples of the spatial domain code word temporally and/or spatially in correspondence with a sampling rate of the image.

Calculating Weighting Factors

Figure 11:
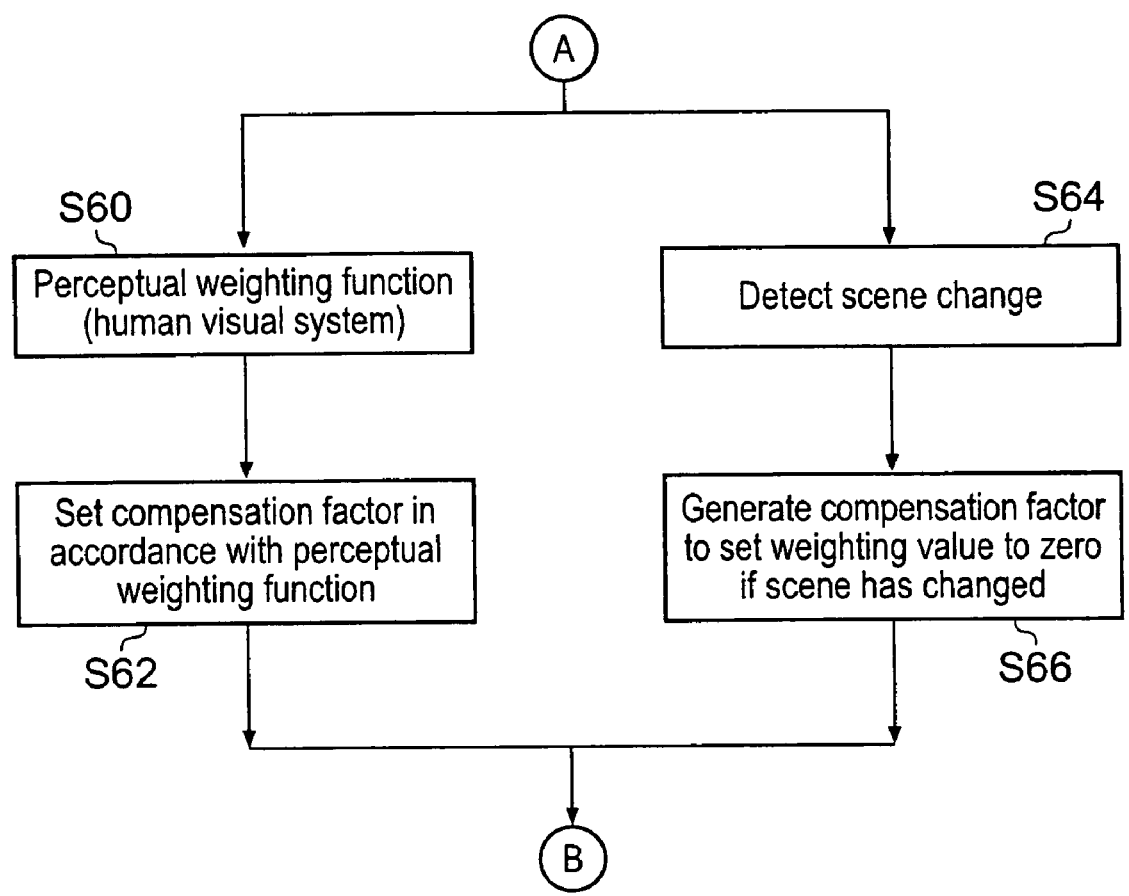
FIG. 11 is a flow diagram illustrating possible further functions of the image analyser.

To summarise the operation of the perceptual image analyser to generate the weighting factors for adapting the strength of the code word coefficents a flow diagram is provided in FIG. 11. The process steps illustrated by the flow diagram on FIG. 11 are summarised as follows:—

S20: A copy of the image is received in base band form within the image analyser.

S22: The image is spatially down-sampled to reduce the number of samples of the image. Optionally the image may also be temporally down-sampled.

S24: The down-sampled image is then divided into image blocks which for example could be blocks having 4×4 pixels. The image blocks are then fed to two separate functions represented in FIG. 11 by process steps on the left-hand side and process steps on the right hand side.

S26: A DCT is performed on the image blocks.

S28: For each image, a relative contrast measure is calculated by comparing the AC coefficient value with the value of the DC coefficient for the DCT domain image.

S30: For each AC coefficient of the DCT domain code word, a maximum allowable contrast is determined from a predetermined relationship between the contrast of the image block and the contrast which would be produced by the code word coefficients in the spatial domain. The relative contrast measure for the image block is therefore used to identify, from this relationship, a maximum allowable contrast which would be caused by the code word coefficient in the spatial domain.

S32: For each AC coefficient, a weighting value $\alpha_{u,v}$ is calculated for each image data block $D_{b,u,v}$ to ensure that the coefficient value does not exceed the maximum allowable value calculated in steps S28 and S30. Effectively, therefore the weighting factor is calculated by scaling the maximum allowable contrast with the DC value of the DCT domain coefficient of the code word for that image block.

S36: The weighting factor values are received and combined or compensated with compensation factors or other weighting values calculated by alternative functions.

S38: As already explained although the contrast masking provided by steps S26 to S34 generates weighting factor values which are proportional to the contrast value of the image, in some examples where there is a significant change in contrast within the image, weighting factor values can be calculated which do not have a desired effect of hiding or masking the code word coefficients. Accordingly, a smoothness compensation function is provided to compensate the weighting factor values calculated in accordance with the masking function. To this end, the image blocks are received and for each block a number of pixels in the block which are determined to be smooth is counted to generate a smoothness factor for the block. A pixel is determined to be smooth if a difference between the value of the pixel with respect to its neighbours does not exceed a predetermined threshold.

S40: For each block a smoothness factor is calculated in accordance with a proportion of smooth pixels in the block.

S42: For each block a compensation function is calculated from the smoothness factor, by comparing the smoothness factor with a predetermined relationship. The predetermined relationship is determined by experimentation with respect to the human eye's perception. Thus, for higher smoothness factors the predetermined relationship has an effect of reducing the weighting factor in order to compensate for images which include edges which would otherwise cause an over-estimation of the strength of the code word coefficients.

S36: As indicated above once the weighing factor values have been calculated the compensation factors are combined with the weighting factors to generate compensated weighting factors.

Figure 12:
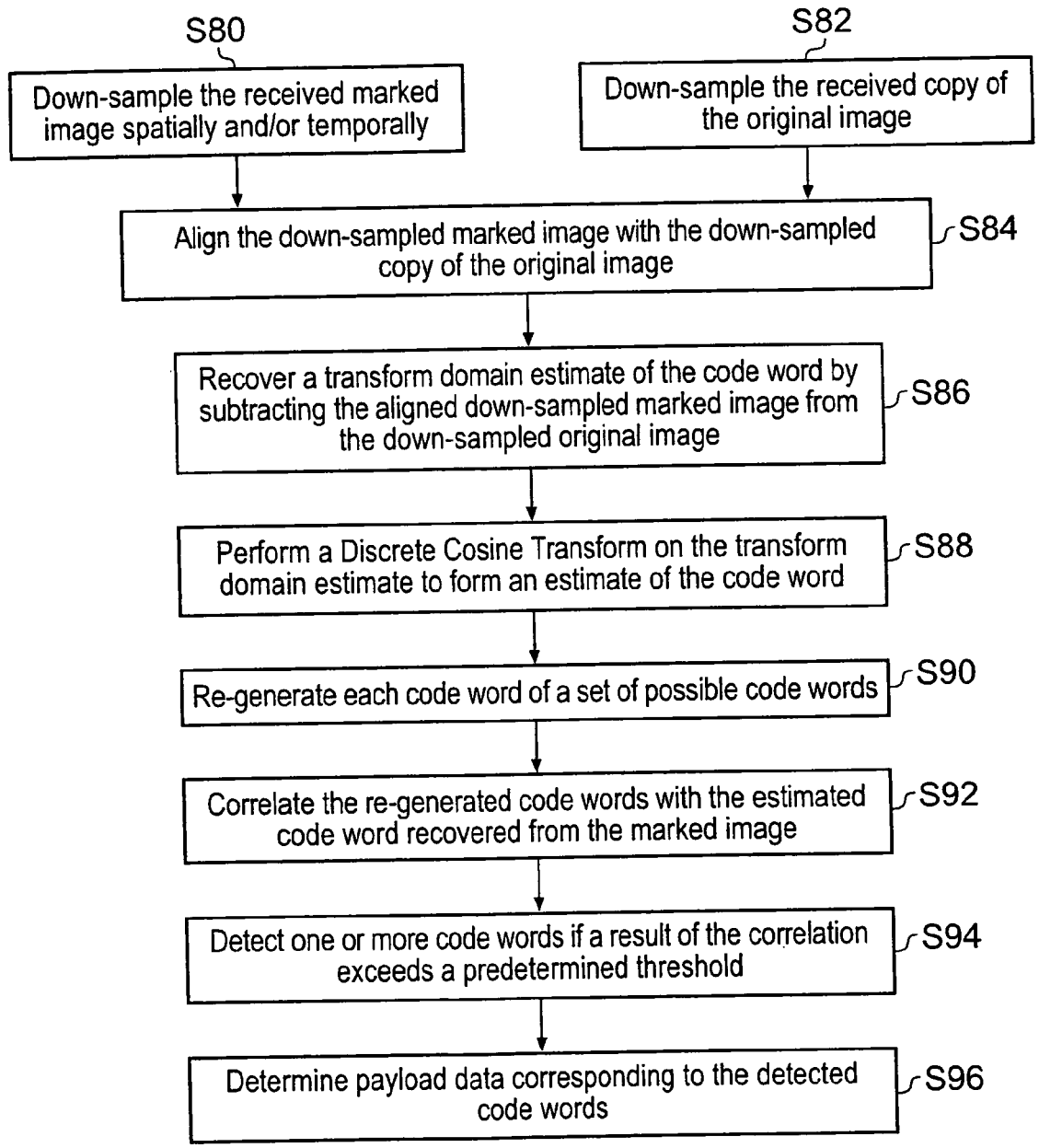
FIG. 12 is a flow diagram illustrating a process for detecting a payload data word from a marked image according to the present technique.

As indicated in FIG. 11 at step S24 further processing functions are possible in order to adjust the weighting factor values or indeed to generate further compensation values which may be combined with the weighting factor values to adjust these values. Examples of such further functions are illustrated in FIG. 12 which corresponds to the perceptual weighting function and the temporal masking 60 come 62 illustrated in FIG. 5. In FIG. 12 the process steps on the left hand side correspond to the perceptual weighting function whereas the process steps on the right-hand side correspond to the temporal masking. The process steps illustrated in FIG. 12 are summarised as follows:—

S60: The image blocks are received in a perceptual weighting function which is applying a function based on the human visual system which may be for example heuristically calculated.

S62: Compensation factors are established for each block in accordance with the perceptual weighting function.

S64: The temporal masking function receives images and detects from the images whether a scene change has occurred.

S66: In accordance with whether a scene change has occurred compensation factors are generated to set the weighting factors to zero if a scene change has occurred. This is because imperfections in an image are more likely to be noticeable by the human eye after a scene change.

As illustrated in FIG. 12 the further compensation factors generated by the flow diagram of FIG. 12 are combined in step S36 with the weighting factor values already generated to produce overall adjusted weighting factors values.

Detecting Process

A flow diagram illustrating a process performed in detecting a code word from which payload data can be recovered is illustrated in FIG. 13. The steps illustrated in FIG. 13 are summarised as follows:—

S80: The marked image from which the payload data is to be recovered is received and spatially and/or temporarily down-sampled in correspondence with a temporally and/or spatially down-sampled domain in which the code word was formed.

S82: A copy of the original image is received and correspondingly spatially and/or temporarily down-sampled, the down-sampling corresponding to the down-sampling performed on the marked image.

S84: A registration process is performed with the effect that the down-sampled marked image is aligned with the down-sample copy of the original image. Alignments is effected so that as far as possible samples to which code word coefficients were added in the original copy of the image correspond to the samples of the down-sampled copy of the image received at the detector. A result of the alignment should therefore increase a likelihood of correctly recovering the code word and detecting the payload data.

S86: A transform domain estimate of the code word is recovered by subtracting the aligned down-sampled marked image from the down-sampled original image. At this point the samples are still in the spatial domain.

S88: A DCT is performed on the transform domain estimate to form an estimate of the code word. As will be appreciated DCT is one example of the transform which could be used.

S90: Code words from the set of possible code words are regenerated.

S92: The regenerated code words are correlated with the estimated code word recovered from the marked image.

S94: One or more code words are detected if a result of the correlation exceeds a predetermined threshold.

S96: The payload data is determined from the code words which are detected by the correlation results.

Applications

The encoding image processing apparatus which is arranged to produce the watermarked images shown in FIG. 2 may be incorporated into a variety of products for different scenarios in which embodiments of the present invention find application. For example, the encoding image processing apparatus may be connected to a web site or web server from which the watermarked images may be downloaded. Before downloading a copy of the image, a unique code word is introduced into the downloaded image, which can be used to detect the recipient of the downloaded image at some later point in time.

In another application the encoding image processor forms part of a digital cinema projector in which the identification code word is added during projection of the image at, for example, a cinema Thus, the code word is arranged to identify the projector and the cinema at which the images are being reproduced. Accordingly, the identification code word can be identified within a pirate copy produced from the images projected by the cinema projector in order to identify the projector and the cinema from which pirate copies were produced. Correspondingly, a watermarked image may be reproduced as a photograph or printout in which a reproduction or copy may be made and distributed.

In addition to the above-mentioned applications of the encoding data processing apparatus of the watermarking system to a cinema projector and to a web server, other applications are envisaged. For example, a receiver/decoder is envisaged in which received signals are watermarked by introducing code words upon receipt of the signals from a communicating device. For example, a set top box is typically arranged to receive television and video signals from a "head-end" broadcast or multi-cast device. As will be appreciated in this application, the encoding data processing apparatus forms part of the set top box and is arranged to introduce watermark code words into the video signals as the signals are received and decoded. In one example embodiment, the watermark code word is arranged to uniquely identify the set top box which receives and decodes the video signals.

Various further aspects and features of the present invention are defined in the appended claims. Various modifications can be made to the embodiments herein before described without departing from the scope of the present invention.

The invention claimed is:

1. An encoding data processing apparatus for generating a marked copy of an image by introducing a code word into a copy of the image, the apparatus comprising
a code word generator operable to generate the code word having a plurality of code word coefficients,
an image perception analyser operable to receive the image and to generate weighting factors for scaling the code word coefficients with respect to each of a plurality of parts of the image with which the code word coefficients are to be combined,
a strength adapter operable to combine the weighting factors with the code word coefficients, and
a combiner operable to combine the weighted code word coefficients with the image, wherein
the image perception analyser includes a contrast masking engine, a smoothness compensation engine and a compensation combiner,
the contrast masking engine being operable
to determine for each of the plurality of parts of the image a relative measure of contrast,
to calculate for each part, a weighting factor in accordance with the relative contrast measure, the weighting factor having an effect of reducing the code word coefficients for image parts having a lower relative contrast measure,
the smoothness compensation engine comprises a neighbour contrast calculator, and is operable
to determine for each image part a smoothness factor by counting a number of smooth pixels in the image part, a pixel being determined to be smooth if a predetermined number of pixels neighbouring said pixel are within a threshold value of said pixel's own value, the smoothness factor of each part then being calculated as a function of a proportion of smooth pixels in the part, and
to generate compensation factors in accordance with the smoothness factors, which when combined with the corresponding weighting factors have an effect of reducing the strength of the code word coefficients for higher smoothness factors, and
the compensation combiner is operable to combine the compensation factors with the weighting factor to provide compensated weighting factors for adapting the strength of the code word.

2. An encoding data processing apparatus as claimed in claim 1, wherein the contrast masking engine includes
a transform processor operable to perform a discrete cosine transform on the image parts,
a contrast calculator operable to calculate the relative contrast measure for each of the image parts from a comparison of each Alternating Current coefficient with a Direct Current coefficient of each of a plurality of Discrete Cosine Transform coefficients provided by the Discrete Cosine Transform of the image, and
a masking function operable
to determine the weighting factor value in accordance with the comparison of the Alternating Current coefficients to the Direct Current coefficients.

3. An encoding data processing apparatus as claimed in claim 2, wherein the masking function is operable for each code word coefficient
to determine a maximum allowable relative contrast measure which the code word coefficient would produce in the image by comparing the relative contrast measure of the image part with a predetermined perceptibility relationship between the relative contrast measure of the image and the relative contrast measure which would be produced by the code word coefficients, and
to calculate the weighting factor value by scaling the determined maximum allowable contrast of the code word coefficient and the Direct Current Discrete Cosine Transform coefficient value of the code word coefficient in the Discrete Cosine Transform domain.

4. An encoding data processing apparatus as claimed in claim 1, wherein the image perception analyser includes
a temporal masking engine operable to generate compensation values which when combined with the weighting factor values by the compensation combiner has an effect of increasing code word coefficients when the images change with respect to time.

5. An encoding data processing apparatus as claimed in claim 4, wherein the change of the images includes scene changes in video material represented by the images.

6. An encoding data processing apparatus as claimed in claim 1, wherein the image perception analyser includes
a perceptual weighting function operable to generate compensation factors with respect to the image parts, which when combined with the weighting factors have an effect of reducing the code word coefficients for image parts in which changes are more noticeable to the human eye than other image parts.

7. An encoding data processing apparatus as claimed in claim 1, wherein the image parts are formed by dividing each image into blocks of pixels having an equal number of pixels.

8. A cinema projector including an encoding data processing apparatus according to claim 1, wherein the encoding data processing apparatus is operable to receive image signals, and to introduce code words into the image signals before reproduction.

9. A media terminal including an encoding data processing apparatus according to claim 1, wherein the encoding data processing apparatus is operable to receive image signals, and to introduce code words into the image signals.

10. A method of generating a marked copy of an image at an image processing apparatus by introducing a code word into a copy of the image, comprising:
generating, at the image processing apparatus, the code word having a plurality of code word coefficients,
generating, at the image processing apparatus, weighting factors for scaling the code word coefficients with respect to each of a plurality of parts of the image with which the code word coefficients are to be combined, combining the weighting factors with the code word coefficients at the image processing apparatus, and combining the weighted code word coefficients with the image, wherein the generating the weighting factors at the image processing apparatus comprises determining for each of the plurality of parts of the image a relative measure of contrast, calculating for each part a weighting factor in proportion with the relative contrast measure, the weighting factor having an effect of reducing the code word coefficients for image parts having relatively low contrast, determining for each image part a smoothness factor by counting a number of smooth pixels in the image part, a pixel being determined to be smooth if a predetermined number of pixels neighbouring said pixel are within a threshold value of said pixel's own value, the smoothness factor of each part then being calculated as a function of a proportion of smooth pixels in the part, and generating compensation factors in accordance with the smoothness factors, which compensation factors when combined with the corresponding weighting factors have an effect of reducing the strength of the code word coefficients for higher smoothness factors, and combining the compensation factors with the weighting factor to provide compensated weighting factors for adapting the strength of the watermark code word.

11. A method as claimed in claim 10, wherein the calculating the weighting factor comprises performing a Discrete Cosine Transform on the image parts, calculating the relative contrast measure for each of the image parts from a comparison of each Alternating Current coefficient with a Direct Current coefficient of each of a plurality of Discrete Cosine Transform coefficients provided by the Discrete Cosine Transform, determining a maximum allowable relative contrast measure which the code word coefficient would produce in the image by comparing the relative contrast measure of the image part with a predetermined perceptibility relationship between the relative contrast measure of the image and the relative contrast measure which would be produced by the code word coefficients, and calculating the weighting factor value by scaling the determined maximum allowable contrast of the code word coefficient and the Direct Current Discrete Cosine Transform coefficient value of the code word coefficient in the Discrete Cosine Transform domain.

12. A non-transitory computer readable storage medium including computer executable instructions executable by a computer to implement a method of generating a marked copy of an image by introducing a code word into a copy of the image, the method comprising generating the code word having a plurality of code word coefficients, generating weighting factors for scaling the code word coefficients with respect to each of a plurality of parts of the image with which the code word coefficients are to be combined, combining the weighting factors with the code word coefficients, and combining the weighted code word with the image, wherein the generating the weighting factors comprises determining for each of the plurality of parts of the image a relative measure of contrast, calculating for each part a weighting factor in proportion with the relative contrast measure, the weighting factor having an effect of reducing the code word coefficients for image parts having relatively low contrast, determining for each image part a smoothness factor by counting a number of smooth pixels in the image part, a pixel being determined to be smooth if a predetermined number of pixels neighbouring said pixel are within a threshold value of said pixel's own value, the smoothness factor of each part then being calculated as a function of a proportion of smooth pixels in the part, and generating compensation factors in accordance with the smoothness factors, which compensation factors when combined with the corresponding weighting factors have an effect of reducing the strength of the code word coefficients for higher smoothness factors, and combining the compensation factors with the weighting factor to provide compensated weighting factors for adapting the strength of the watermark code word.

* * * * *